United States Patent [19]

Peng et al.

[11] Patent Number: 4,769,650
[45] Date of Patent: Sep. 6, 1988

[54] AUTOMATIC INK-JET MARKING SYSTEM

[75] Inventors: Yu-Yin Peng; Shih-Lien Fu; Huei-Huay Huang, all of Hsing Chu Hsien, Taiwan

[73] Assignee: Industrial Technology Research Institute, Hsin Chu Hsien, Taiwan

[21] Appl. No.: 82,086

[22] Filed: Aug. 5, 1987

[51] Int. Cl.⁴ ............................................ G01D 15/18
[52] U.S. Cl. ................................ 346/75; 346/140 R
[58] Field of Search ................................ 346/75, 140

[56] References Cited

U.S. PATENT DOCUMENTS

| | | | |
|---|---|---|---|
| 4,067,020 | 1/1978 | Arway | 346/75 |
| 4,378,564 | 3/1983 | Cross | 346/75 |
| 4,393,386 | 7/1983 | DiGiolio | 346/75 |
| 4,539,570 | 9/1985 | Moore | 346/75 |
| 4,564,846 | 1/1986 | Siegal | 346/75 |

Primary Examiner—Joseph W. Hartary
Attorney, Agent, or Firm—Cushman, Darby & Cushman

[57] ABSTRACT

An automatic ink jet marking system composed of a nozzle set, an ink supply device and a micro-computer control device which uses a fixed nozzle set to mark a moving object, particularly a system which uses microcomputer to edit, save and retrieve data and to give control signal in reponse to movement of object as detected by a position sensor and a speed sensor to drive a solenoid valve module and consequentially the nozzle module to spray ink for marking via a driver.

4 Claims, 6 Drawing Sheets

AUTOMATIC INK-JET MARKING SYSTEM

BACKGROUND OF THE INVENTION

Markings on carton generally include contents, weight, specification, name of manufacturer, date of manufacture, price, lot number, catron number, name and address of consignee, and other data subject to change from case to case. Though data may be printed on carton in advance, it is not flexible for a production line which makes a variety of products, and results in large inventory of packaging materials. For marking of data subject to change from case to case, robber chop, spray printing with paper pattern, label or hand writing are applied and all such methods are of inefficient, and not matching with the integrated process in modern packing works.

Printing by sprayer is a feasible resolution for marking on carton. That is, within the principle of forming a marking by dot matrix, using if a vertical row of fixed nozzles to spray ink to the surface of a moving carton to print the markings is feasible. To implement such an idea, some technical problems must be overcome: 1. Structure of nozzle set must be capable of satisfy number of nozzles required for different size of marking, expansion of nozzle set must be easy, and precise nozzle must have effective measures to prevent from contamination and blockade; 2. Solenoid valve of quick response (such as operating at a frequence of up to 300 Hz) and adjustable; 3. Ink supply device must be incorporated with level indicator and have measures which allow replenishment of ink without interruption of ink supply to the nozzles; and 4. Its control device must be capable to edit, save and retrieve marking data, and control spraying of ink according to the position and moving speed of the object to be printed.

U.S. Pat. No. 4,378,564 discloses a representative prior art which comprises an ink source, control means and sprayer to form an ink jet printing apparatus. Its sprayer is an assemble of nozzles and solenoid vlaves, but direct expansion of nozzle set is not possible, and its solenoid valve is of unadjustable. Furthermore, replenishment of ink requires interruption of ink supply to nozzles, and its control means can't control ink spraying in response to the speed of the object. Therefore, the prior art is not satisfactory enough.

SUMMARY OF THE INVENTION

The present invention related to an ink jet marking system, particularly a system which applies a micro-computer to control and to spray ink to mark on the surface of a moving object.

An objective of the present invention is to eliminate the defects described above, and to provide a structure of nozzle set which permits removal, cleaning and connection of nozzles, adjustable solenoid valves; an ink supply device which permits replenishment without interrupting spraying process, and a control device to give exact control on time of spraying in response to the moving speed of the object.

In order to achieve the above-mentioned objectives, the present invention is therefore composed of a nozzle set, an ink supply device and micro-computer control device. The nozzle set comprises a nozzle module and a solenoid valve module having several nozzles and several solenoid valves respectively. The nozzle module can be expanded directly, nozzles is formed on an injection board which can be removed for cleaning, and the injection board is designed with ink residus drain slots to prevent from contamination and blockade. The solenoid valve has an adjustable valve needle and spring structure. The ink supply device is composed of an ink reservoir with a level alarm filling tank, a compressed air source and two shut-off vlaves at its pipelines so that ink spraying process can continue during ink refilling. The sensor device to the marking object is composed of a position sensor and a speed sensor so that the operational sequence of the nozzle set under control of the micro-computer may meet various speed of the object.

BRIEF DESCRIPTION OF THE DRAWINGS

FIG. 6—1 illustrates the enlarged partial injection board.

DETAILED DESCRIPTION

Figure 1:
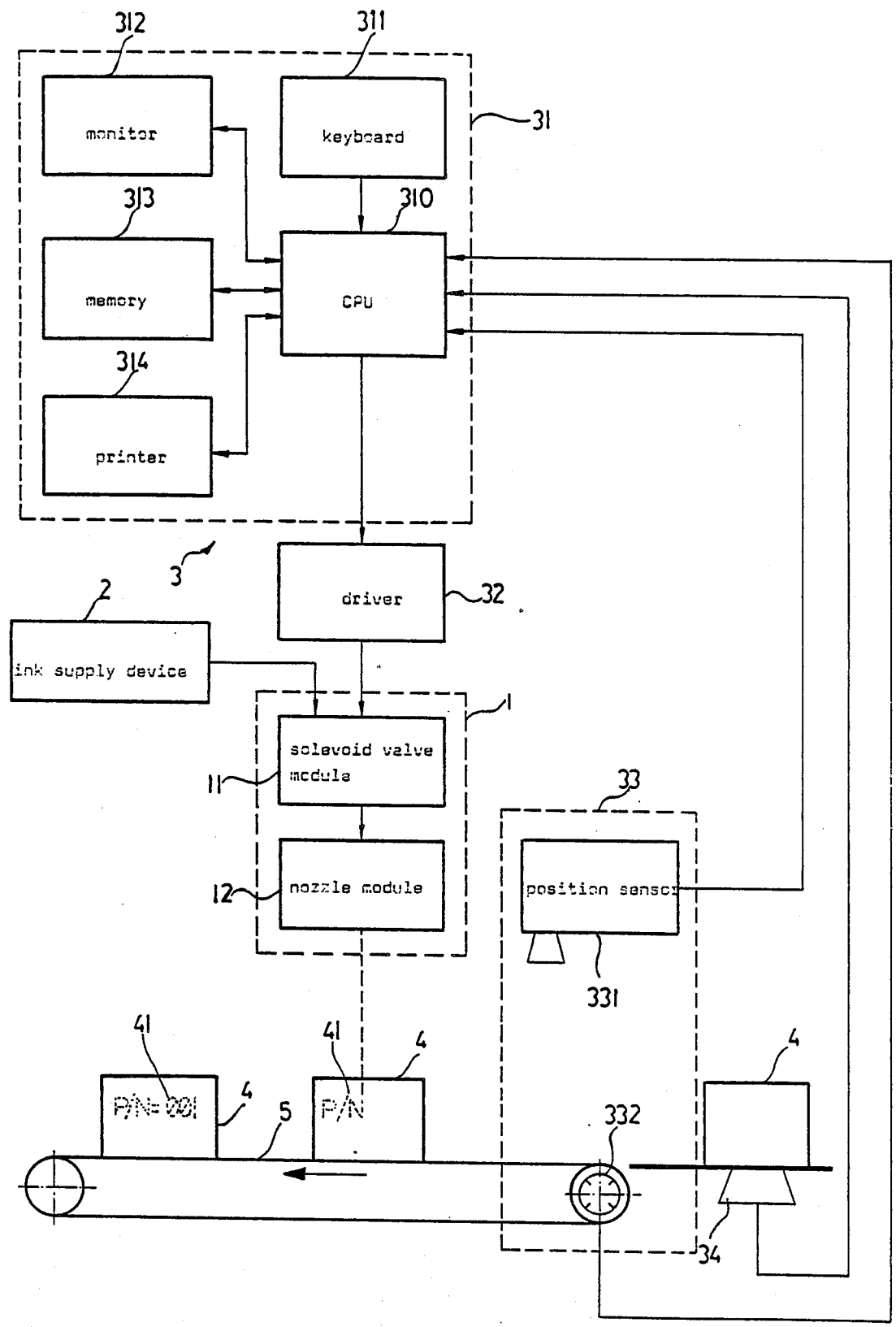
FIG. 1 is a block diagram of a system according to the present invention.

Please refer to FIG. 1, the automatic ink jet marking system according to the present invention is comprising a control device 3 composed of a micro-computer 31, a driver 32 and sensors 33, an ink supply device 2 and a nozzle set 1 composed of solenoid valve modules 11 and nozzle modules 12. The micro-computer 31 is incorporated with a CPU 310, a keyboard 311, a monitor 312, a memory device 313 and a printer 314 for editing, saving retrieving and printing. The CPU 310 resolves dot matrix of characters/drawings, and according to the detection of a position sensor 331 and a speed sensor 332 which detect the position and speed of the object 4 on a conveyor 5 passing by the fixed nozzle modules 12 gives timely control signal via a driver 32 to operate the solenoid valve modules 11 and consequentially the nozzle modules 12 to spray ink in a form of dot matrix to the surface of the object 4 to form the desired characters/drawing 41. Each nozzle module 12 is composed of nozzles in a number equal to or greater than the number of dots representing the height of a character. Upon horizontal movement of the object 4, the position sensor 331 such as a photo sensor or an ultrasonic sensor detects the front edge of the object 4, sequentially the micro-computer 31 calculates moving distance of the object 4 according to the signal from the speed sensor 332, (such as an encoder installed on a roller of the conveyor 5). When the object 4 is passing by in front of the nozzle module 12 to a specified position, the nozzle module 12 is ordered to spray ink for dots of the first row. Following movement of the object 4, dots of the second row, third row . . . are printed till the complete content of characters/drawing is printed. Therefore, the sequence of ink spraying is designed synchronizing with the movement of the object 4 to provide perfect characters/drawing appearance. At the front end of the conveyor 5 an electronic scale 34 is installed to weigh the object for giving weight data of the object to the micro-computer 31 for reference in recording or for weight marking.

Figure 2:
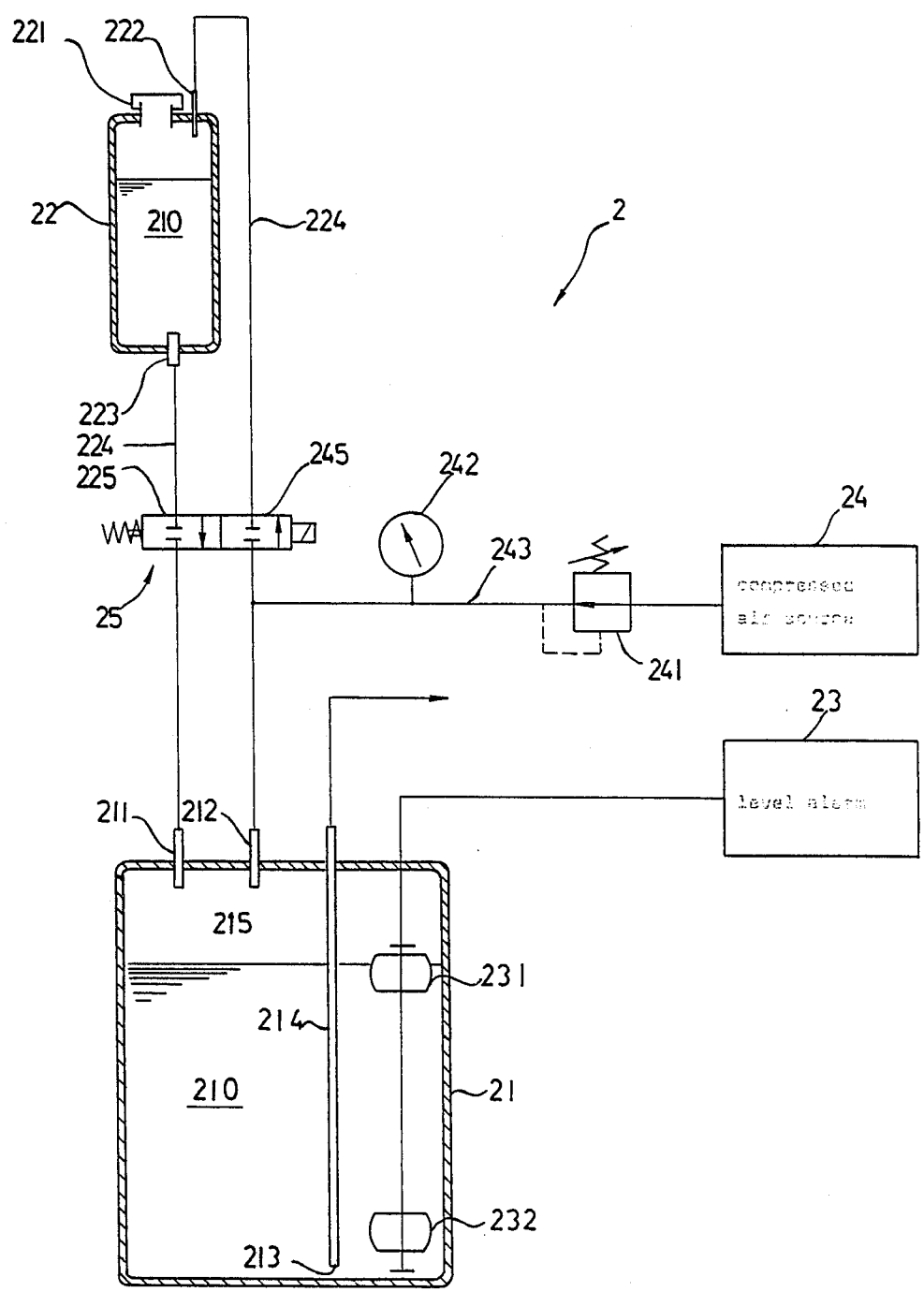
FIG. 2 illustrates an ink supply device according to the present invention.

FIG. 2 illustrates an ink supply device 2 according to the present invention. It comprises an ink reservoir 21, an filling tank 22, a level alarm 23 and a compressed air source 24. The ink reservoir 21 is a closed container with an ink inlet port 211 and an air inlet port 212 at the top and an ink outlet port 213 near the bottom. A pipe 214 is connected to lead ink 210 toward the nozzle set 1. Two level detectors 231 and 232 (for instance, float switches) are equipped within the reservoir 21 to detect ink level at upper level limit and lower level limit, and send signals to the level alarm 23 for giving an indication or audible alarm to remind operator to replenish ink in good time. The compressed air source 24 includes a regulator valve 241, pressure gauge 242 and other necessary device to maintain an appropriate pressure. Via a pipeline 243, the compressed air source 24 is connected to air inlet port 212 and then an air chamber 215 in the upper part of the reservoir 21 to force out the ink 210. The filling tank 2 is installed at a level higher than the reservoir 21. It has an ink filler and lid 221, an air inlet port 222 connecting via a pipeline 244 and a shut-off valve 245 to the compressed air source 24 on the top, and an outlet port 223 connecting via a pipeline 224 and a shut-off valve 225 to the reservoir 21 on the bottom. For replenishing of ink, both shut-off valves 225 and 245 are closed (a solenoid valve module 25 for interlocking of these two shut-off valves is shown in the drawing), but pressure existing in the reservoir 21 continues supply of ink. As the filling tank 22 is thus isolated from the reservoir 21, the lid 221 on the filling tank 22 can be opened for refilling of ink 210! After refilling of ink, the lid 221 is closed and the valves 225 and 245 are opened. While the air pressure in the filling tank 22 and in the reservoir 21 remains the same, as the ink 210' is at the higher level, it flows to the reservoir 21 by its own gravity to complete replenishment of ink 210.

Figure 3:
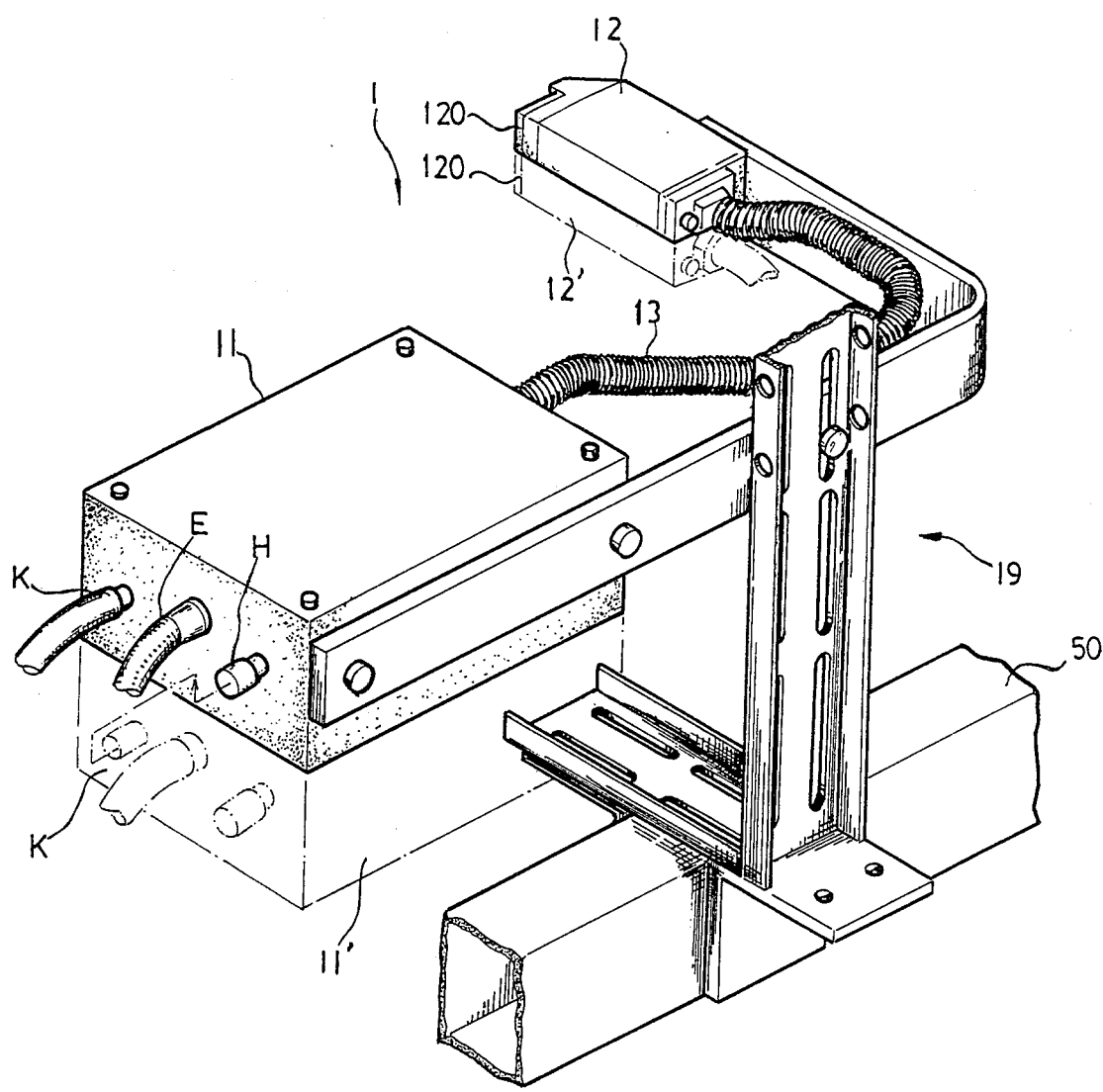
FIG. 3 illustrates an embodiment of a nozzle set according to the present invention.

FIG. 3 shows a nozzle set 1 according to the present invention. The nozzle set 1 is composed of a solenoid valve module 11 and a nozzle module 12 connecting to the said solenoid valve module 11 by means of a plurality of flexible ink pipes 131 covered by a flexible protecting hose 13. The solenoid valve module 11 and the nozzle module 12 are supported by a frame 19 at respective positions. The frame 19 is placed on a support 50 at the conveyor 5 shown in FIG. 1 in a manner that distance between the nozzle module 12 and the object 4 and height of the nozzle module 12 are of adjustable. The solenoid valve module 11 and the nozzle module 12 are of rectangular structure. As shown in the drawing, the nozzle set 1 can be expanded by connecting the solenoid valve module 11 and the nozzle module 12 to other solenoid valve 11' and nozzle module 12' respectively. Injection boards 120, 120' are placed in front of the nozzle modules 12, 12'. Each of the injection boards 120, 120' has a series of orifices arranged vertically. The orifices are aligned with each other after the spray boards 120, 120' are connected, and each two consecutive orifices are maintained at equal interval. That is, the height of the nozzle module 12 and the spray board 120 is equal to the product of orifice interval by number of orifices, and distance between a side orifice and the upper/lower edge of the spray board 120 is equal to a half of the orifice interval. Each solenoid valve module 11 is connecting to an ink inlet pipeline K, wire E and exhaust pipe H. The exhaust pipe H is for bleeding of air at the initial stage of ink supply from the ink pipeline and then blocked, and used as a connecting pipe for inlet of ink after the expansion of nozzle sets. As shown in FIG. 3, the exhaust pipe H is connecting to the ink inlet pipeline K' for supply of ink to the solenoid valve module 11'.

Figure 4:
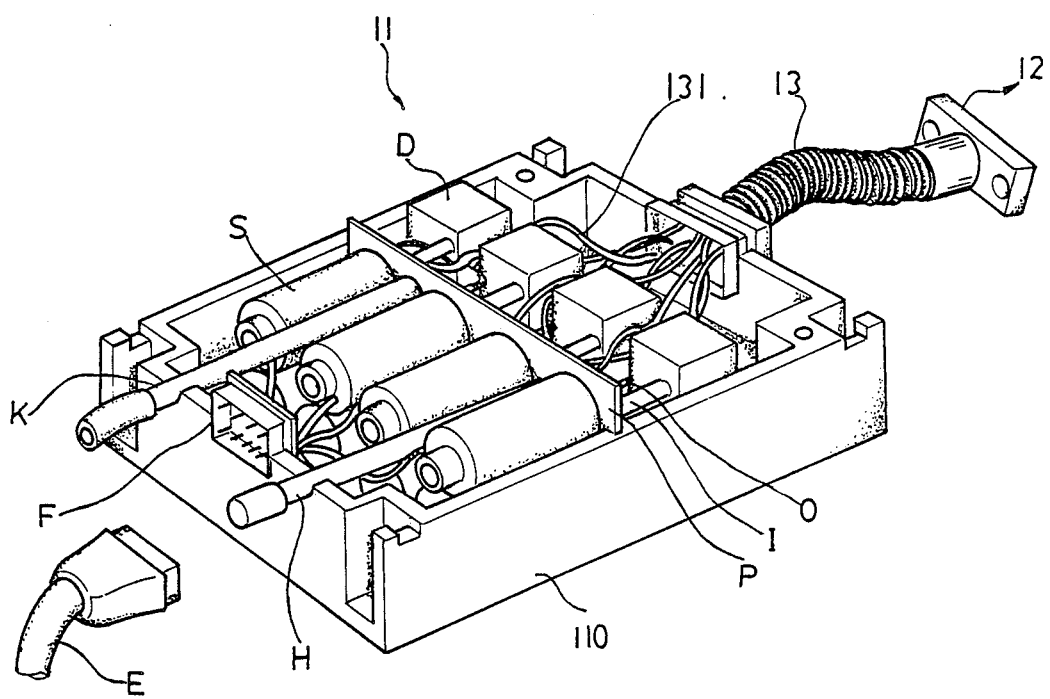
FIG. 4 illustrates the internal structure of an embodiment of a solenoid valve module according to the present invention.

FIG. 4 illustrates the internal structure of an embodiment of a solenoid valve module according to the present invention. The solenoid valve module 11 has a bottom casing 110 and an upper casing of the same shape (not shown in the drawing) with slots and holes at four corners for connection purpose. It has an installation board P on which a plurality of solenoid valves S (8 solenoid valves are shown in the drawing) arranged in two layers is installed. Lead wires from coil of the solenoid valves are welded to a connector F and then to the valve driver 32 via signal wires E. An ink inlet pipe K and an exhause pipe H is passing thought space among the solenoid valves S and the installation board P and then connecting to a distribution box D. Each solenoid valve S is incorporated with an ink inlet pipe I and an ink outlet pipe O. All of such ink inlet pipes I are connected at the distribution box D, and ink led by the ink inlet pipes I reach each respective solenoid valve S. Whenever the solenoid valve S works, ink is discharged from the ink outlet pipes O and connected to the nozzle module 12 via ink pipelines 131 within a protecting hose 13.

Figure 5:
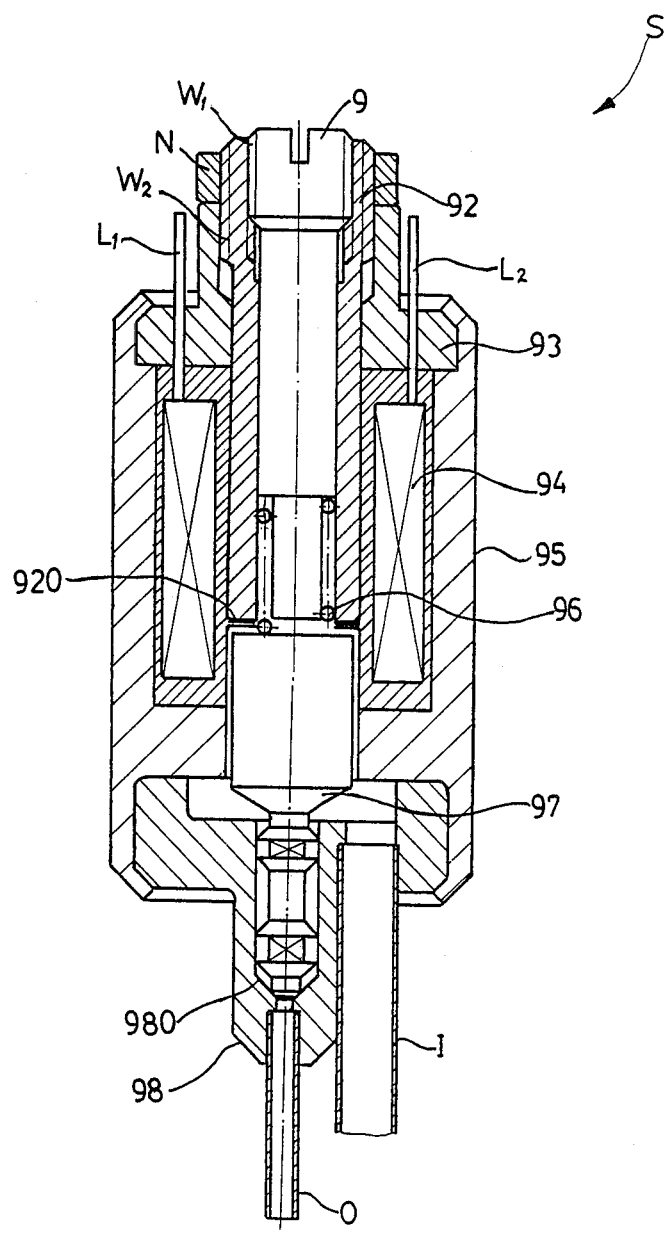
FIG. 5 is a cross-sectional view of the embodied solenoid valve illustrated in FIG. 4.

FIG. 5 is a cross-sectional view of a solenoid valve S comprising mainly a spring adjuster 91, a stator tube 92, a stator shoulder 93, a coil 94, a casing 95, a spring 96, a valve needle 97 and valve seat 98. The spring adjuster 91 is located within the stator tube 92 and has a thread W1 at its external end for positing its axial position relative to the stator tube 92 in order to change strength of compression exerted by the spring 96 to the valve needle 97 and therefore change the compression force of the spring 96. The stator tube 92 is placed in the stator shoulder 93 and has a thread portion W2 at the external end to adjust its relative position, and for fixing with a nut N after adjusting clearance between its inner end 920 and the valve needle 97 which determines lift of the valve needle 97. Proper and accurate setting of the above mentioned compression force and clearance can allow the solenoid valve to acquire an appropriate reaction characteristic (such as an operating frequency of 300 Hz or up). The adjustable structure of the present invention solves problem in assembly and adjustment caused by tolerance of machining. The stator shoulder 93 is pressed on the casing 95, on which the coil 94 with wires L1 and L2 are installed. The valve needle 97 is moveably installed in a guide hole on the casing 95 and the valve seat 98. When current is passing through the winding 94 to generate a magnetic field, the valve needle 97 is absorbed and opens the valve port 980 so that ink from the ink inlet pipe I is discharged through the ink outlet pipe O.

Figure 6:
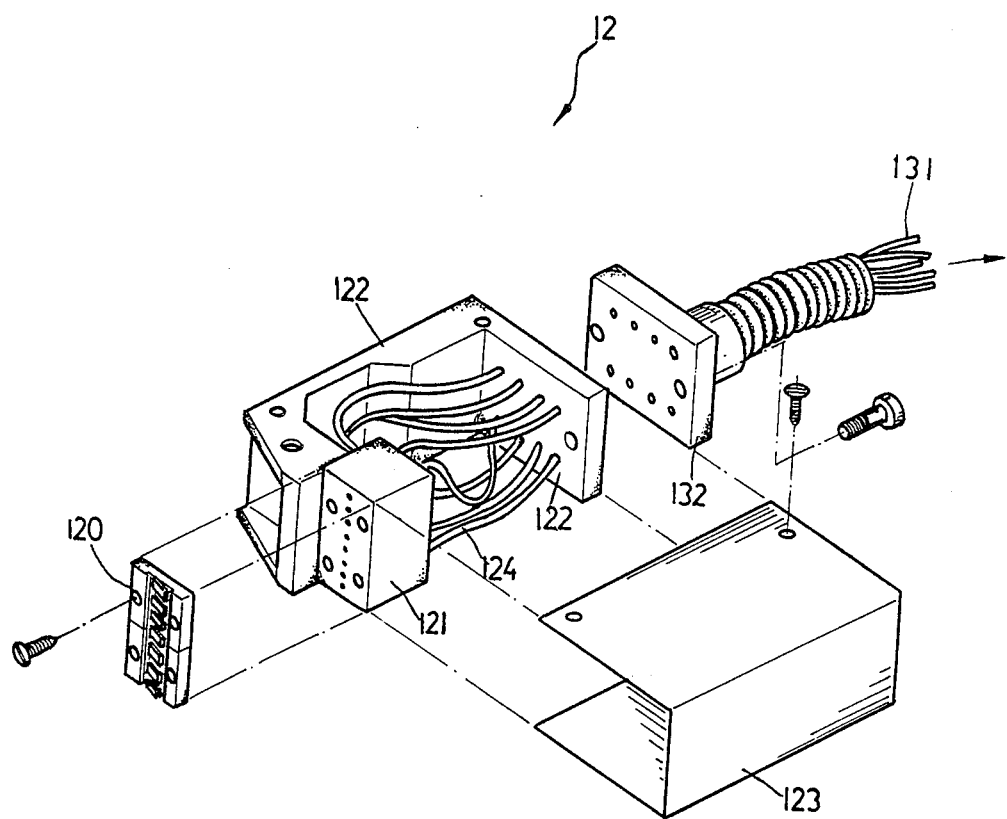
FIG. 6 illustrates the internal structure of a nozzle module according to the present invention.
Figures 1, 6:
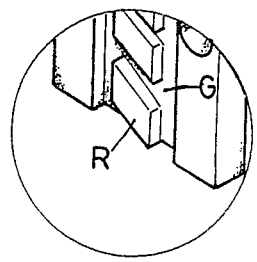

FIG. 6 and FIG. 6—1 illustrate the internal structure of an embodiment of a nozzle set according to the present invention. The nozzle set 12 is composed of an injection board 120, an injection board holder 121, a frame 122, an ink inlet plate 122', a hood 123, and ink pipes 124. The ink inlet plate 122' is a part of the frame 122 and connecting all the ink pipelines 131 from the solenoid valve module 11 and to the corresponding pipes 124 via a connector 132. The frame 122 is connected to the hood 123 to protect pipes 124 therein and has screw holes at appropriate positions for installation. The injection board holder 121 is fixed to the front end of the frame 122 by means of bolts. There are rows of ink holes on the injection board holder 121 connecting to pipe 124 of the ink inlet plate 122' via the ink pipes 124. The injection board holder 121 has some screw holes for fixing of injection board 120 in front of it. On the spray board 120 there are orifices R connecting to the ink holes on the injection board holder 121. The aforesaid connector 132, ink inlet plate 122', injection board holder 121 and injection board 120 are of removeable design to ease removal and cleaning. Beneath each spray hole R outside the injection board 120, i.e., between each two consecutive orifices R there is a drain slot G declining downward to connect ink residues after priting so that the ink residues will not contaminate orifice below it and will not cause blockade. As for the height of the spray board, the thickness of the nozzle module and the orifice interval, they are disigned to ease expansion as described above.

I claim:

1. An automatic ink jet marking system having a fix nozzle set to spray ink to the surface of a moving object for marking, comprising:

a nozzle set composed of at least one nozzle module each having a plurality of nozzles arranged in a vertical row points perpendicularly to the horizontally moving object, and at least one solenoid valve module each having solenoid valves respectively connected to each of said nozzles via flexible pipelines for injecting ink from said nozzles to the object in response to control signals given by a microcomputer to form dot matrix presenting sysbols; said nozzle modules capable of connected in a line to multiply nozzles with constant nozzle interval;

an ink supply device composed of an ink reservoir, an filling tank, a level alarm and a compressed air source applying pressure to the ink, said ink reservoir is substantially a closed container having an ink ourlet port near the bottom, an ink inlet and an air inlet port on the top, and containing upper level limit and lower level limit detectors to give signal to said level alarm, the ink outlet port is connecting to the solenoid valve module by a pipeline, said ink inlet port is connecting to an outlet port at the bottom of said filling tank via a first valve, said air inlet port is connecting to said compressed air source by a pipeline; said filling tank is jocated with its bottom at a level higher than the top of said ink reservoir, has a ink filler and a lid on the top, and an air inlet port connecting to the compressed air source via a second valve so that when both said valves are shut off, said filling tank is isolated from said ink reservoir but ink supply continues, said filling tank can be opened to replenish ink and then closed, and after opening both said valves, ink in said filling tank can flow into said ink reservoir by its own gravity and therefore ink refilling can be done without interrupting ink spraying process; and a control device composed of a micro-computer for processing marking data and generating control signals, a driver transforming said signals and driving said nozzle set, and sensors including a position sensor to detect position of the object and a speed sensor to detect speed of the object; said micro-computer giving signals in response to the movement of the object as detected by said sensors.

2. A system as claimed in claim 1 wherein each nozzle module in said nozzle set composed of an even thickness body structure having pipelines connected to said solenoid valve module, an injection board removably fixed to said body structure and furnished with a plurality of nozzle orifices in equal interval; length of the injection board is just equal to the product of orifice interval by number of orifices, i.e. the distance between a side orifice and edge of the injection board is equal to one-half of the orifice interval.

3. A system as claimed in claim 1 wherein said nozzle modules are installed horizontally with their orifices in vertical rows for printing on surface of the object and there is a drain slot declining downward below each orifice to collect ink residues to avoid contamination of other orifices.

4. A system as claimed in claim 1 wherein said solenoid valve module has an ink inlet to guide ink to a distributor box for distributing to inlets of said solenoid valves, said distributor box connecting to an exhaust pipe for discharge of air at the initial stage and for connecting to other solenoid valve module for expansion of the system, each of said solenoid valves having a valve seat, a valve needle and an ink inlet at the front end, a coil, a stator shoulder, a stator tube and a spring adjuster at the rear end, by means of threads formed thereon, the response characteristic of said solenoid valve can be adjusted.

* * * * *

UNITED STATES PATENT AND TRADEMARK OFFICE
CERTIFICATE OF CORRECTION

PATENT NO. : 4,769,650
DATED : September 6, 1988
INVENTOR(S) : PENG et al

It is certified that error appears in the above-identified patent and that said Letters Patent is hereby corrected as shown below:

IN THE DRAWINGS:

FIG. 1, No. 11, read "solevoid" as --solenoid--.

FIG. 2, read the label of the line to inlet port 222 as

FIG. 3, read the label to the injection board of nozzle module 12' as --120'-- and read the label of the inlet pipeline of valve 11' as --K'--.

FIG. 5, read the label "9" as --91--.

FIG. 6, read the label of the ink inlet plate as --122'--.

IN THE SPECIFICATION:

Column 3, line 21, read "2" as --22--.

Column 3, line 33, read "210!" as --210'.--.

Signed and Sealed this

Second Day of May, 1989

Attest:

DONALD J. QUIGG

Attesting Officer

Commissioner of Patents and Trademarks